United States Patent [19]

Kennedy

[11] Patent Number: 4,520,139

[45] Date of Patent: May 28, 1985

[54] PECTIN AND RELATED CARBOHYDRATES FOR THE PREPARATION OF POLYURETHANE FOAMS

[75] Inventor: Richard B. Kennedy, Ridgefield, Conn.

[73] Assignees: Patrick James Crehan; Richard J. Fricke, both of Ridgefield, Conn.; a part interest to each

[21] Appl. No.: 635,212

[22] Filed: Jul. 26, 1984

[51] Int. Cl.$^3$ ............................................. C08G 18/14
[52] U.S. Cl. ................................. 521/109.1; 106/162; 106/208; 521/175
[58] Field of Search ............................ 521/109.1, 175; 106/162, 208

[56] References Cited

U.S. PATENT DOCUMENTS

| | | | |
|---|---|---|---|
| 4,291,129 | 9/1981 | Kennedy | 521/103 |
| 4,337,594 | 7/1982 | Hanacek et al. | 521/68 |
| 4,400,475 | 8/1983 | Kennedy | 521/103 |
| 4,404,294 | 9/1983 | Wiedermann | 521/109.1 |

Primary Examiner—Maurice J. Welsh
Attorney, Agent, or Firm—Wyatt, Gerber, Shoup, Scobey and Badie

[57] ABSTRACT

Gel forming polysaccharides such as pectin react with polyisocyanates to form useful polyurethane foams.

22 Claims, No Drawings

PECTIN AND RELATED CARBOHYDRATES FOR THE PREPARATION OF POLYURETHANE FOAMS

RELATED PATENTS

This invention is in some respects an improvement of the inventions described and claimed in U.S. Pat. Nos. 4,291,129 and 4,400,475, the complete disclosures of which are incorporated herein by reference.

BACKGROUND OF THE INVENTION

The present invention relates to the production of polyurethane foams which may contain flame retardants and to compositions useful for the preparation of such foams.

It is known to produce polyurethane foams by reactions between polyisocyanates and polyhydroxy compounds in the presence of polyurethane foam producing catalysts, water as a blowing agent, and other components often including auxiliary blowing agents, particularly halogenated hydrocarbons. Such foams are produced in flexible, semi-rigid and rigid foams, and are employed for a wide variety of purposes. The chemistry of polyurethane foam production and the various applications of the foam products has been widely studied, is well known and need not be discussed in depth herein.

Industrial polyols useful for the preparation of polyurethane foams are generally polyethers or polyesters carrying reactive hydroxyl groups. The above-identified U.S. patent describes the use of carbohydrates including mono-, di-, oligo- and polysaccharides in place of industrial polyols and the use of mixtures of such carbohydrates and industrial polyols.

Pectin is a member of a special class of polysaccharides which have the ability to form gels with simple sugars and acid. The class includes other gel forming polysacchardes such as alginic acid and guar gum. The major chemical building block of pectin is galacturonic acid. The carboxylic acid groups of the galacturonic acid may be methylated, neutralized or free. The degree of methylation is normally used as a method of classifying various pectins. Some of the carboxyl groups may be neutralized with metallic ions such as sodium or calcium.

In pectic acid all of the carboxyl groups of the galacturonic acid are free. In pectinic acid some of the carboxyl groups are methylated, but none are neutralized. In pectin there is partial methylation and partial neutralization. All of these polysaccharides are useful in this invention and, for convenience, will be referred to herein as pectin. The invention will principally be described as it applies to pectin since this is the preferred reactant and readily available commercially. However, other gel forming polysaccharides such as alginic acid and guar gum can be similarly employed in the practice of the invention.

THE INVENTION

It has now been discovered that gel forming polysaccharides such as pectin are especially useful for the preparation of polyurethane foams by reacting the selected polysaccharide with a polyisocyanate in an aqueous medium in the presence of a surfactant and an amine type polyurethane producing catalyst. The reaction is applicable to pure pectin as well as to pectins with various degrees of methylation. It is applicable also to pectin with industrial polyols, with other carbohydrates or with mixtures of industrial polyols and other carbohydrates.

The term "carbohydrate" when used to describe the compositions of this invention refers to the saccharide content of the compositions other than the gel form polysaccharide.

A special advantage of the use of pectin with mixtures of industrial polyols and other carbohydrates is that the density of the foams produced can be controlled over a wide range, for example from 1 or less to 20 or more pounds per cubic foot.

The particular advantage of the use of pectin and other gel forming polysaccharides is that the reaction mixture producing the foam can contain as much as 45% by weight, based on the total weight, of water and still produce a useful foam. While some patents suggest that foam forming mixtures can contain a large amount of water without adverse affect, as a practical matter very little water is employed in the industrial preparation of foams.

In the one shot preparation of flexible foams in which all of the reactants are brought together through a foaming nozzle and laid on a conveyor to permit the foam to rise, it is customary to employ up to about 4% by weight of water as a blowing agent. Most of the foam rise, however, is attained through the use of auxiliary blowing agents. This adds to the cost and complexity of the operation. For the preparation of semi-rigid and rigid foams somewhat larger amounts of water can be employed, but still considerably less than in the practice of this invention.

Packaging foams, or other types of foams where the reactants are mixed on site generally employ two separate mixtures, one containing the polyisocyanate, the other the polycol reactant. If the polyol reactant is an industrial polyol no water can be used. The water would react with the polyisocyanate and destroy it if used on the so called A-side. The industrial polyol does not dissolve in water, so there is a mixing problem with the so called B side before the two sides can be brought together.

The products of this invention are polyurethane foams produced by reaction between a polyisocyanate and an aqueous slurry or solution containing a gel forming polysaccharide such as pectin, a surfactant and an amine type polyurethane foam producing catalyst. The reaction mixture may also contain carbohydrates and or industrial polyols as polyurethane forming reactants. Conventional additives such as flame retardants, pigments, plasticizers, dyes, clays, organic fillers and the like, may also be present.

The foams of the present invention are especially useful as packaging foams and to retrofit buildings with insulation. For this use, they will usually be prepared in rigid form and will contain flame retardants. A particular advantage of such foams is that, unlike most polyurethane foams which melt and collapse when they are exposed to flame, the foams of this invention tend to maintain their cell structure even when exposed to high temperatures. The foams of the present invention used for retrofit purposes can be prepared under conditions which will generate very low pressure during production so that they can conveniently be used as foam-in-place insulation for existing structures.

Accordingly, the invention will be described with principal emphasis on the preparation of on site foam employing two separate mixtures which contain, at least, the polyisocyanate, the surfactant and, if employed, the flame retardant. The second mixture contains, at least, the gel forming polysaccharide, the catalyst, and water. For convenience, the first mixture is referred to as the A-side and the second as the B-side.

In contrast to the conventional polyurethane foam producing compositions, the compositions of this invention may contain large amounts of water. In fact, useful packaging foams can be produced from compositions containing as much as 97% water if pectin is the only polyol employed. In many instances, the compositions reacting to form the foam will contain at least 40% water, and useful foams can be produced from solutions and slurries containing 65% water, all by weight based on the total weight of the composition.

If the one shot process of foam production in which all of the reactants and other components of the foam producing mixture are brought together through a nozzle is employed, there is no stability problem. However, for on site applications, the B-side containing, the carbohydrate and the catalyst may tend to become less reactive with the passage of time. The shelf life may be as low as three months. The shelf life of the B-side compositions of this inveniton can be extended to at least six months, and even longer by the addition of sufficient alkaline reagent to achieve pH in the aqueous mixture of at least 9, preferably 9 to 11. This is described and claimed in my copending and concurrently filed application Ser. No. 634,786.

Any of a wide variety of alkaline reagents including inorganic and organic compounds can be employed. Generally weaker bases such as organic amines are preferred. Of the inorganic reagents, weak bases such as sodium carbonate or bicarbonate are preferred. A particularly preferred inorganic reagent is a mixture of sodium metasilicate, sodium sesquicarbonate and sodium perborate. It is available under the trade name Mex from United Gilsonite Laboratories of Scranton, Pennsylvania. Primary, secondary or tertiary amines can be employed. The preferred organic amines are triethanol amine and 2-amino-2-methyl-1-propanol.

Those skilled in the art will recognize that certain amines, such as triethanole amine can be employed both as a catalyst and as a stabilizing agent. Thus if the B-side contains such a catalyst, the amount will be about 5 to 10% by weight based on the total weight. About half will function as a catalyst, the balance as a stabilizer. If only a catalytic quantity is employed, the shelf life of the mixture will be short.

The foams of the present invention can be produced in rigid, semi-rigid and flexible forms.

Typical flame retardants which may be employed include, for example, sodium chloride, calcium chloride, borax, alkalimetal borates, tricresyl phosphate, tris(2-chloroethyl)phosphate, tris(chloropropyl)phosphate, O,O,diethyl-N,Nbis(2-hydroethyl)aminomethyl phsophate, metal oxides and chlorides such as antimony oxide, alumina, and antimony oxychloride.

Polyisocyanates which can be used in the present invention include, for example, methylene diisocyanate; tolylene-2,4-diisocyanate; polymethlene polyphenyl isocyanate; tolylene-2,6-diisocyanate; diphenylmethane, 4,4'-diisocyanate', 3-methyldiphenylmethane-4,4'diisocyanate', m- and p-phenylenediisocyanate; naphthalene-1,5-diisocyanate; and mixtures of these products. Either crude or pure isocyanates can be used. A prepolymer polymeric isocyanate which can be prepared by the reaction of an excess of polyisocyanate with a less amount of a carbohydrate polyol having more than two hydroxyl groups per molecule can be used in this invention. The combined use of two or more polyisocyanates is also possible.

Polyols which can be used in this invention include polyether polyols prepared by combining one or more alkylene oxides (such as ethylene oxide, propylene oxide, and butylene oxide) with a reaction initiator (such as water, ethylene glycol, glycerine, trimethylol-propane, pentaeryhritol, ethylenediamine sorbitol, and sucrose). Another type of polyol that can be used is a polyester polyol having hydroxyl groups at the ends prepared by a condensation reaction of one or more polyhydroxyl alcohols, such as ethylene glycol or trimethylol-propane, with one or more polycarboxylic acids, such as adipic, phthalic, or succinic acids. Another example of a polyol useful in the present invention is a polymer polyol which can be prepared by graft polymerizing polyacrylonitrile to an aliphatic polyol.

Water is used with the carbohydrate in the present invention in order to provide a carrier for the carbohydrates and inorganic salts. The amount of water used is kept to a minimum to prevent "sighing", i.e., the collapse of the foam, as well as to aid in the reduction of the pressure of the foaming reaction.

Mixtures of various types of industrial polyols with pectines are useful in the practice of this invention. For example, a stable, non-separating B-side can be prepared by using pectin in association with standard rigid foam producing aromatic amine polyols and other polyols normally employed to produce flexible foams such as polypropylene glycol polyether polyols.

The water in the reaction mixture causes the evolution of carbon dioxide, by the reaction with isocyanate. The carbon dioxide functions as a blowing agent. The density can be adjusted by varying the amounts of water in the mixture or by using auxiliary blowing agents such as low boiling hydrocarbons, carbon dioxide, or halohydrocarbons such as chlorofluoroalkanes. This is analogous to the conventional preparation of polyurethane foams, and the same auxiliary blowing agents are employed. Suitable blowing agents will, as is known, be chemically inert toward the reactants and have boiling points below 100° F., preferably from −50° F. to 70° F. Suitable halohydrocarbons include methylene chloride, ethylenetrichloride, trichloromonofluoromethane, and dichlorotetrafluoroethane.

The catalysts used in the process of this invention are amine type catalysts including amine catalysts such as aliphatic tertiary amines, N-substituted morpholines and N,N'-substituted piperazines, more specifically, triethylamine, dimethylaminoethanol, diethylcyclohexylamine, lauryldimethylamine, triethanolamine, tetrakis(2-hydroxypropyl) ethylenediamine, N,N,N',N'- tetramethylethylenediamine, N-methylmorpholine, N-ethylmorpholine, bis(2-hydroxypropyl)2-methylpiperazine, 2,2,2-(diazabicyclooctane)triethylenediamine, 1,2,4-trimethylpiperazine, triethylenediamine, 2-methyl imidazole, 1,2-dimethyl imidazole, and other polyurethane producing catalysts known to those skilled in the art.

Catalysts which have been found to be particularly useful in the present invention are aminohydroxyl compounds, such as 2-amino-2-methyl-1-propanol, tris-(hyroxymethyl)aminomethane, and 2-amino-2-ethyl-1,3-propanediol.

Those skilled in the art will know that there are certain industrial polyols available which carry amino groups. These include, for example, the aromatic amine polyols available from BASF as Pluracol 735 and from Mobay as Multranol 9215. With such polyols it is not necessary to use extrinsic catalysts. If the mixture is used in a one-shot process, no stabilizer is required. For on-site foaming, it is best to stabilize the B-side by the addition of sufficient alkaline reagent to attain a pH of at least 9. In this description and claims, when a composition is said to contain a catalyst it includes both the intrinsic catalyst of amine polyols and the conventional external catalysts.

Surfactants which have been found useful in the present invention include, for example, Dow Corning (R) 92-5098 also known as DC 5098, which is a nonhydrolyzable silicone glycol copolymer. Union Carbide's (R) L 5420 and 5340 are other nonhydroyzable silicone glycol copolymers which may be used. Other surfactants include Air Products' LK-221 (R), LD-332, and LK-443, all organic surfactants which can be used as a total replacement for the usual silicone surfactants. Other Dow Corning silicone surfactants which can be used in foams made according to the present invention include Dow Corning 190, 191, 193, 196, 197, 198, 1312, F-11-630, 1315, Q2-5023 and Q2-5103.

As indicated above, the process of the application is applicable to pectin alone, to pectin with other carbohydrates, preferably untreated mono- and disaccharides in which substantially all of the hydroxyl groups are free, to pectin with industrial polyols and to pectin with mixtures of carbohydrates and industrial polyols.

With pectin alone, for on site production, the A-side will contain at least the isocyanate and the surfactant. It may also contain a flame retardant and a plasticizer. Certain of the products normally used for plasticizers also have a flame retardant affect.

Typically useful isocyanates which are available commercially are Mondur MR available from Mobay, Lupinate M-20 available from BASF and the Papi series, e.g. Papi 20, 29, 135 and 350 available from Upjohn. All are understood to be principally 4,4'-diphenylmethane diisocyanate.

The B-side, when pectin is utilized as the only carbohydrate will contain the pectin, water and the amine type polyurethane foam forming catalyst. Typically useful catalysts include the Dabco series available from Air Products, Inc., and the A-series such as A-1 or A-10, available from Union Carbide. The B-side may contain from about 2 to 5% by weight pectin, 0.5 to 5% by weight catalyst and 90 to 97% by weight water. All weight percentages in this application are based on the total weight of the composition. The mix will contain a sufficient amount of alkaline reagent so that the pH is at least 9.

The A-side may contain from about 70 to 80% by weight polyisocyanate, 1.5 to 7% surfactant and 1.5 to 25% by weight plasticizer or flame retardant, if employed.

The mixing ratio for on site foaming is from 0.75:1 to 2:1, preferably 1:1 to 1.5:1.

The fire retardant or plasticizer should be hydrolytically stable to be used in the B-side. Otherwise, it can be added to the A-side. In the latter case, however, it should be chemically inert to polyisocyanates.

When the pectin is used with carbohydrates, it is convenient to use for the preparation of the B-side the various sugar syrups which are commercially available, such as Isosweet, a high fructose syrup produced by Staley Industrial Products or corn syrup available from Corn Products. These syrups contain about 40% by weight of water. Alternatively, syrups or slurries can be prepared by taking up the selected carbohydrates in water, which may be made basic by the addition of an alkaline reagent, to a concentration of about 30% to 65% water. The selected quantity of pectin can be mixed with the syrup. It is convenient to dissolve the pectin in water, for example, 5 to 15% by weight of pectin in water and mix the solution with the syrup or slurry. Compositions intended for use as B-side compositions should not contain sufficient pectin and carbohydrate so that the mixture will gel on standing. Of course this is not a problem in the one shot process.

Typically useful B-side mixtures will contain 40 to 60% by weight water, 40 to 60% by weight carbohydrate, 2 to 10% by weight pectin and 0.5 to 5% by weight catalyst in addition to the alkaline reagent to raise the pH to at least 9. These B-side compositions can be mixed with A-side in the same ratio defined above to produce useful foams.

If the only polyol in the B-side in addition to the pectin is an industrial polyol, the relative amounts of industrial polyol, pectin, water and catalyst are as described in the previous paragraph.

If the B-side contains industrial polyol in addition to carbohydrate and pectin, the non-pectin polyol content can be about equally divided between industrial polyol and carbohydrate, but the amounts may vary over a wide range. Thus, the B-side composition may contain 15 to 50% water, 30 to 35% carbohydrate, 15 to 50% industrial polyol, 2 to 5% pectin and 0.5 to 5% by weight catalyst.

The following table summarizes the preferred range of components in B-side compositions of this invention. Considerable divergence from these ranges can be tolerated without adverse effect.

| | Pectin Alone | Pectin Plus Carbohydrate | Pectin Plus Industrial Polyol | Pectin Plus Carbohydrate Plus Industrial Polyol |
|---|---|---|---|---|
| Pectin | 2–5% | 2–5% | 2–5% | 2–5% |
| Carbohydrate | — | 30–35% | — | 30–35% |
| Industrial Polyol | — | — | 10–90% | 15–50% |
| Water | 90–97% | 30–65% | 10–90% | 15–50% |
| Catalyst | 0.5–5% | 0.5–5% | 0.5–5% | 0.5–5% |

The water carbohydrate-industrial polyol blends are preferred embodiments of this invention since by varying the ratio of water to industrial polyol it is possible to achieve variations in density over a very wide range of useful products, from extremely flexible to very rigid products. In fact, the density may range from about 1 to 20 pounds per cubic foot. Generally speaking, the density can be decreased by increasing the ratio of carbohydrate to polyol, by increasing the amount of catalyst, or by the use of auxiliary blowing agents. Other properties of the foams can be modified by varying the ratio of carbohydrate to polyol and by selection of the industrial polyol from the wide range of polyether and polyester type polyols which are available.

In the manufacture of pectin there is a waste stream containing principally water and a low concentration of pectin. This waste stream is generally regarded as an environmental hazard. A very significant advantage of the process of this invention is that this waste stream occasionally with evaporation of some of the water content can be employed in the preparation of B-side compositions.

The following non-limiting examples are given by way of illustration only.

EXAMPLES 1–9

The selected amount of water is weighed into a 200 ml stainless steel beaker and heated to 180° F. The pectin is added while stirring with a double two inch blade stainless steel marine type propeller at 2200 rpm, and stirring is continued for three minutes. The selected amount of carbohydrate is added if desired and heating and stirring is continued for an additional eight to ten minutes at about the same temperature. The mixture is cooled to ambient temperature and the industrial polyol added, if desired. Stirring is continued for ten minutes while heating to about 125° F. The selected stabilizer is added at that temperature with stirring over an additional five minutes. The mixture is cooled to about 75° F. and the catalyst is then added with stirring to complete the preparation of the B-side.

The B-side is mixed at a 1:1 ratio with an A-side containing 70 pbw polymethylene polyphenyl isocyanate (Mobay, Mondur MR), pbw Dow Corning DC 5098 silicone surfactant and 30 pbw of tris(2-chloroethyl)phosphate flame retardant (Stauffer FYROL (CF).

The resulting mix is stirred for 2 seconds and quickly poured into a suitable container to permit the foam to rise.

The following table shows the mixtures used to form 9 different foams. Foams 1, 2 and 5 are semi-rigid. Foams 3, 4 and 7 are rigid. Foams 6, 8 and 9 are flexible.

EXAMPLE 10

The above examples are repeated in a one-shot process, omitting the stabilizer to produce substantially similar products.

FORMULATIONS

| Example | H$_2$O/g | Pectin/g | Stabilizer/g | Catalyst/g | Additional Carbohydrate/g | Industrial Polyol/g | A-side/g |
|---|---|---|---|---|---|---|---|
| 1 | 69 | [1]Slow Set 150/1 | NaCO$_3$/3 | [3]Dabco-T/2 | [6]5500 HFCS/25 | — | 150 |
| 2 | 86.7 | Slow Set 50/10 | MEX/0.3 | [4]Polycot 17/3 | — | — | 150 |
| 3 | 81 | Slow Set 150/1 | NaCo$_3$/3 | [5]AMP—95/15 | — | — | 150 |
| 4 | 0 | Slow Set 50/10 | MEX/0.3 | Dabco Solid/.5 | [7]1632/40 | 735/50 | 100 |
| 5 | 37 | Slow Set 50/7.5 | MEX/0.7 | Dabco-T/1.5 | Sucrose/55.5 | — | 100 |
| 6 | 37 | Slow Set 50/7.5 | MEX/0.7 | Dabco-T/1.5 | Sucrose/55.5 | 873/100 | 253 |
| 7 | 64 | Slow Set 150/1 | NaCo$_3$/3 | Dabco-T/2 | — | 9214/30 | 100 |
| 8 | 40 | Slow Set 50/10 | MEX/.35 | Dabco-T/2 | — | 873/50 | 100 |
| 9 | 93 | [2]USP/5 | — | Dabco-T/2 | — | — | 100 |

[1]Slow set is a brand of pectin available from General Foods Corporation containing a small amount of dextrose.
[2]USP is United State Pharmacopoeia grade pectin.
[3]Dabco-T is a tertiary amine catalyst.
[4]Polycot 17 is a tertiary amine catalyst.
[5]AMP—95 is 2-amino-2-methyl-1-propanol.
[6]HFCS is high fructose syrup available from Staley Industrial Products.
[7]1632 is a corn syrup available from Corn Products.
[8]Containing 70 pbw Mondur MR, 30 pbw CEF and 1 pbw DC 5098.

What is claimed is:

1. A polyurethane foam made by reacting a composition containing a polyisocyanate, a surfactant, an amine type polyurethane producing catalyst, a gel forming polysaccharide and water.

2. A polyurethane foam as in claim 1 wherein the polyssaccharide is guar gum or alginic acid.

3. A polyurethane foam as in claim 1 or 2 additionally containing a flame retardant.

4. A polyurethane foam made by reacting a composition containing a polyisocyanate, a surfactant, an amine type polyurethane producing catalyst, pectin and water.

5. A polyurethane foam as in claim 4 containing a flame retardant.

6. A polyurethane foam as in claims 4 or 5 additionally containing a carbohydrate.

7. A polyurethane foam as in claims 4 or 5 additionally containing an untreated carbohydrate in which substantially all of the hydroxyl groups are free.

8. A polyurethane foam as in claim 5 wherein the carbohydrate is selected from the group consisting of corn starch, cellulose, corn syrup, dextrose, fructose and sucrose.

9. A polyurethane foam as in claim 4 or 5 additionally containing an industrial polyol.

10. A polyurethane foam as in claim 9 additionally containing an untreated carbohydrate in which substantially all of the hydroxyl groups are free.

11. A polyurethane foam as in claim 10 wherein the carbohydrate is selected from the group consisting of cornstarch, cellulose, corn syrup, dextrose, fructose and sucrose.

12. A composition useful for the preparation of polyurethane foams comprising a surfactant, an amine type polyurethane foam producing catalyst, a gel forming polysaccharide and water.

13. A composition as in claim 12 wherein the polysaccharide is guar gum or alginic acid.

14. A composition as in claim 12 or 13 additionally containing a flame retardant.

15. A composition useful for the preparation of polyurethane foams comprising a surfactant, an amine type polyurethane foam producing catalyst, pectin and water the pH of the composition being at least 9.

16. A composition as in claim 15 additionally containing a flame retardant.

17. A composition as in claims 15 or 16 additionally containing a carbohydrate.

18. A composition as in claim 15 or 16 additionally containing an untreated carbohydrate in which substantially all of the hydroxyl groups are free.

19. A composition as in claim 18 wherein the carbohydrate is selected from the group consisting of cornstarch, cellulose, corn syrup, dextrose and sucrose.

20. A composition as in 15 and 16 additionally containing an industrial polyol.

21. A composition as in claim 20 additionally containing an untreated carbohydrate in which substantially all of the hydroxyl groups are free.

22. A composition as in claim 21 wherein the carbohydrate is selected from the group consisting of cornstarch, cellulose, corn syrup, dextrose, fructose and sucrose.

* * * * *

UNITED STATES PATENT AND TRADEMARK OFFICE
CERTIFICATE OF CORRECTION

PATENT NO. : 4,520,139
DATED : May 28, 1985
INVENTOR(S) : RICHARD B. KENNEDY

It is certified that error appears in the above—identified patent and that said Letters Patent is hereby corrected as shown below:

Line 24, column 7 insert "1" before --pbw--

Signed and Sealed this

Fifth Day of August 1986

[SEAL]

Attest:

DONALD J. QUIGG

Attesting Officer     Commissioner of Patents and Trademarks